March 29, 1955  J. R. PARACHEK  2,704,963
RETRACTIBLE REAR VIEW MIRRORS
Filed Nov. 3, 1950
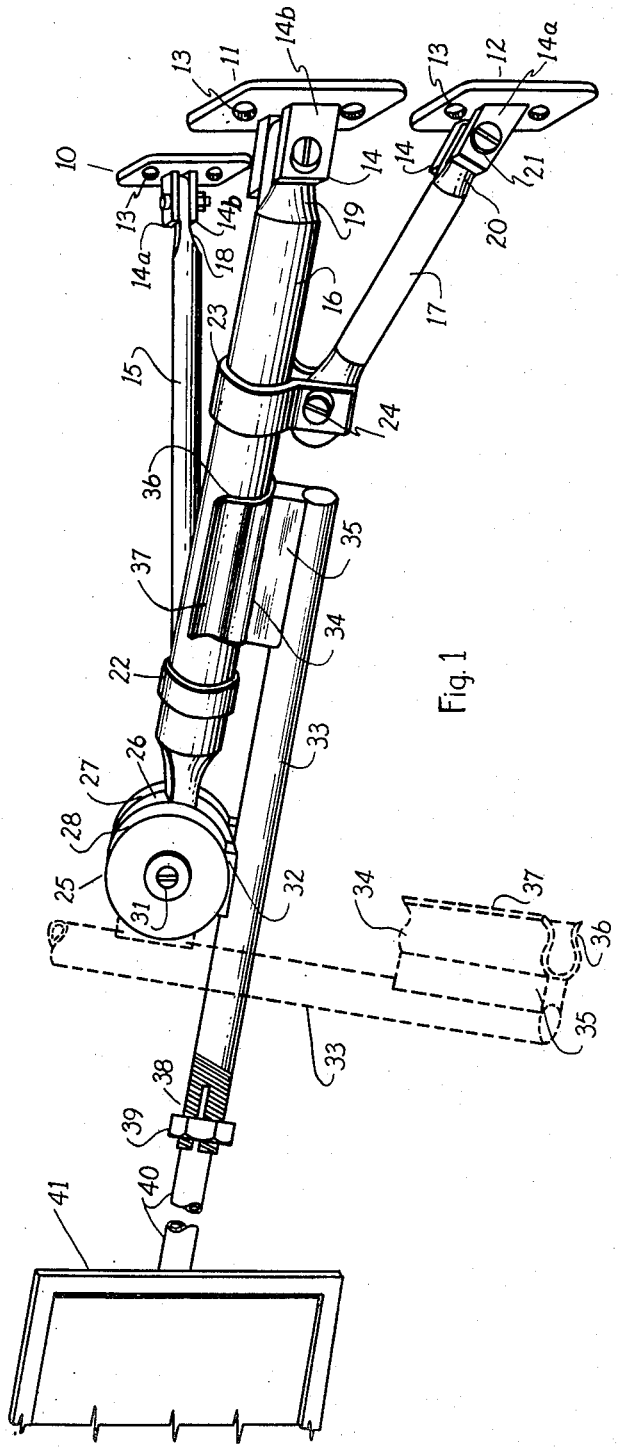
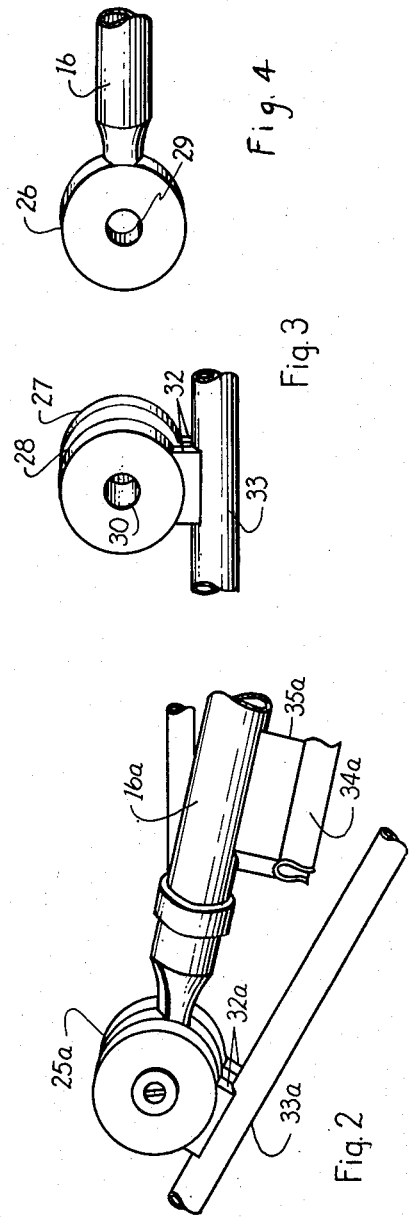
INVENTOR
JOSEPH R. PARACHEK
by Jos R Scalzo
ATTORNEY

United States Patent Office 2,704,963
Patented Mar. 29, 1955

2,704,963

RETRACTIBLE REAR VIEW MIRRORS

Joseph R. Parachek, Toledo, Ohio

Application November 3, 1950, Serial No. 193,879

1 Claim. (Cl. 88—98)

This invention relates to rear view mirrors and in particular to retractible mirrors as employed on the outside of trucks and the like. In general the retractible rear view mirror of the present invention comprises a main and auxiliary support arms with their foundation on the truck frame or body and a retractible mirror arm pivotally connected to the main support arm by means of a friction knuckle and a clamp means for releasably clamping the mirror arm to the bracket section when the mirror is in its proper viewing position.

The need for an all purpose and satisfactory truck rear view mirror has been long felt. Particularly is this true for trucks that are subjected to a variety of adverse running conditions including especially close parking situations and unusually bumpy or uneven roads. Because of the non-retractibility of the protruding rear view mirrors in general use today, there frequently is considerable danger of striking the mirror when maneuvering a truck into certain close fits or parking situations and also because of the extended mirror arm, the running vibration often makes viewing impossible and when once moved from its proper viewing position whether by accident or for protection, returning the mirror arm to its exact former position is generally difficult and time consuming.

An object of the present invention is to produce a retractible rear view mirror that can instantly and easily be retracted from its viewing position by a truck operator and just as quickly and easily returned to its exact and proper viewing position. This, of course, protects the mirrors from damage during certain truck maneuvers and parking situations while also frequently allowing the truck to move into positions and places that would not otherwise be accessible to it due to the protruding extended mirror arm, while at the same time accomplishing their ends with no wasted motion or lost time on the part of the operator.

Another object of the present invention is to produce a rear view mirror that not only is retractible in function but also one that will give a minimum of running vibration and, hence, afford the best possible running vision.

A further object is to provide a rear view mirror that fulfills the best functions of such a mirror and yet is cheap to construct, easy to install, and readily adaptable to all types and contours of truck bodies.

These and other objects will become apparent as the details of this invention are hereinafter more fully described.

For purposes of illustration but not of limitation, the accompanying drawings forming a part of this specification show that:

Figure 1 is a perspective view of a preferred embodiment of the entire retractible mirror ensemble, here showing the retractible mirror arm in its locked viewing position as well as showing the same arm in its open or retractible position;

Figure 2 is a fragmentary perspective view of the friction knuckle and the clamp showing the clamp on the main support arm; and Figures 3 and 4 are fragmentary perspective views of a disassembled friction knuckle.

Now referring particularly to the drawings accompanying this description one embodiment of the present invention comprises foundation mountings 10, 11, and 12 for adjustably connecting the entire mirror ensemble to the body or frame of a truck by some bolting means through apertures 13. Pivotal mountings 14 on each of the foundation mountings are arranged to permit the auxiliary support arms 15 and 17 as well as the main support arm 16 to be moved into proper mounting position regardless of the contour of the truck frame or body upon which the mirror ensemble is to be mounted. The pivotal mounting 14 is a dual flanged extension 14a and 14b with the flattened end portion 18, 19 and 20 of the supporting arms wedged between the flanges and pin connections 21 serving both as a bearing pivot and a tightening element for the flattened end portions.

Slideable and adjustable on the length and circumference of the main support arm 16 are compression clamps 22 and 23 for pivotally connecting the outer end portions of auxiliary supporting arms 15 and 17 to the main support arm 16 by means of pin connections 24 which serve both as a tightening means for making the clamps rigid on the main support and for permitting further adjustability of the effective lengths of auxiliary support 15 generally to the side of, and of auxiliary support 17 generally beneath, the main support arm 16, to give maximum support and minimum vibration.

On the end portion of main support arm 16 is a friction knuckle 25 consisting in this preferred embodiment of circular friction flanges 26, 27, and 28 with centered apertures 29 and 30 through all the flanges to permit a pinbolt 31 to act both as a pivot for the friction knuckle and a tightening element to adjust the surface friction on the center flange 26 and to help prevent any unwarranted turning movement on the part of flanges 27 and 28.

Integral with friction flanges 27 and 28 and separated only by spacer 32 is the retractible mirror arm 33 and integral with one end position of the mirror arm 33 and separated from it only by spacer 35 is a releasable spring clamp 34 which is constructed to exert considerable friction and spring pressure against the main support arm 16 when in its clamped or stopped position and this is accomplished in part by having the cross section of the receiving opening of the clamp 34 at cross section 36 being slightly less than the cross section of the main support arm 16 so that a tight fit can be had both for receiving and releasing. The outer end portions 37 of clamp 34 are flanged outwardly to act as guides in receiving the main support arm 16. The dotted lines in Figure 1 of the attached drawing show mirror arm 33 and clamp 34 in the released or retracted position.

The preferred friction knuckle 25 and the preferred mirror arm 33 are arranged to enable circular movement only in the plane of the main support arm 16 and this movement plane is generally vertically and such so that the clamp 34 will abut against and firmly grasp the underside of main support arm 16 and in this way have the assistance of the leverage and gravity forces in maintaining a firmer abutment with the main support arm 16 caused by the extended weight of the retractible mirror arm 33.

Also to insure the proper operation of this mirror ensemble the portion of the main support arm 16 that receives clamp 34, and which portion shall be designated as the main support arm clamp receiving area, will generally be adjacent and nearer the flanged end portion 26 than to the foundation or truck mounting end portion 11. Likewise the dual flanged portion 27 and 28 of the mirror arm 33 will be adjacent and nearer the spring clamp 34 than to the mirror head. Thus insuring that the effective weight of the mirror arm portion on the mirror head side of the dual flanges always will be greater than the effective weight of the mirror arm portion on the spring clamp side, so that the gravity fulcrum effect of the mirror arm will always tend to make a firmer abutment of the clamp against the underside of the main support clamp receiving area.

In order to adjust the length of the retractible mirror arm 33 an ordinary compression fitting 38 and tapered nut 39 are employed to compress the outer shell of main mirror arm 33 against the mirror head extension arm 40 which is adjustable and slideable within the main mirror arm 33. At the outer end of the mirror arm extension 40 is connected an adjustable mirror head 41 with movement in all directions independent of the general mirror arm structure, the mirror head 41 of course being used for viewing purposes.

The length of support arms 15, 16 and 17 as well as the retractible mirror arm 33 and extension 40 will depend on the type and size of truck in question and the extended distance required for satisfactory rear viewing; however, satisfactory service has been realized with the supporting arms extending about half the distance of the totally extended mirror and with one auxiliary support arm disposed beneath the main support arm and connected to the main support arm either in front or behind the clamping position, and the other auxiliary support arm disposed to the side of the main support arm and connected to the main support arm near its outer end portion. The distance from the spring clamp 34 to the friction knuckle 25 should be only a fraction of the total mirror arm length so as to permit the weight of the extended mirror arm and mirror head 41 to exert a leverage effect and cause the clamp 34 to more firmly abut against and maintain contact with the main support arm 16. The spring clamp 34 and the compression clamps 22 and 23 must be arranged so as not to conflict with each other for position on the main support arm, it being possible to have one or both compression clamps 22 and 23 on either side of the spring clamp 34 when spring clamp 34 is in its clamped position.

Particular attention is called to Figure 2 of the attached drawing which shows a fragmentary perspective view of a second preferred embodiment of the present invention with the spring clamp 34a integral with the underside of the main support arm 16a in place of being on the mirror arm 33a as heretofore described. In this way the purpose and function of the present invention can just as well be satisfied and the extended weight of the mirror head and mirror arm can exert a leverage effect to force a firm abutment of the mirror arm into the clamp 34a while the friction knuckle need not be changed in any way to accomplish this function.

From the described invention it is manifest that what has been described as a retractible rear view mirror is a new and improved as well as a much needed invention in the field of truck rear view mirrors. It also is to be understood that only the preferred embodiments of the present invention have been discussed and that many minor changes and alterations may be made to fall within the scope of the appended claim.

What is now claimed is:

A retractible rear view mirror comprising a main support arm having a single flange on one end portion, a truck mounting means on its opposite end portion and a clamp receiving area near said flanged end portion; a retractible mirror arm having a mirror head on its one end portion, a releasable spring clamp on its opposite end portion clampingly engaging the underside of said clamp receiving area on said main support arm, dual flanges on said mirror arm receiving said single flange on said main support arm, and said dual flanges being positioned on said mirror arm between said spring clamp and said mirror head near said spring clamp so that the effective weight of the mirror arm portion on the mirror head side of said dual flanges always will be greater than the effective weight of the mirror arm portion on the spring clamp side of said dual flanges in order that the gravity fulcrum effect of the mirror arm will always tend to make a firmer abutment of the clamp against the underside of said main support clamp receiving area when the mirror is in its operating position; and said dual flanges being pivotally connected to said single flange at their centers for movement of said mirror arm in one plane; two auxiliary support arms, each having a truck mounting means on one end portion and a main support connecting means on its opposite end portion, and one of said auxiliary support arms being disposed to the side of said main support arm and connected to said main support arm at a point near said main support clamp receiving area, and said second auxiliary support arm being disposed beneath said main support arm and connected to said main support arm at a point near said clamp receiving area and between said main support arm clamp receiving area and said main support arm truck mounting means in order to support the main support arm and still not interfere with the movement of the mirror arm and the clamping function.

References Cited in the file of this patent
UNITED STATES PATENTS

| Number | Name | Date |
|---|---|---|
| 444,273 | Cliff | Jan. 6, 1891 |
| 566,360 | White | Aug. 25, 1896 |
| 1,154,838 | Best | Sept. 28, 1915 |
| 1,525,043 | Primrose | Feb. 3, 1925 |
| 1,714,003 | Deach | May 21, 1929 |
| 1,921,310 | Crisman | Aug. 8, 1933 |
| 2,047,325 | Jones | July 14, 1936 |
| 2,552,074 | Thompson | May 8, 1951 |